United States Patent
Shimizu et al.

(10) Patent No.: US 7,333,949 B2
(45) Date of Patent: Feb. 19, 2008

(54) APPARATUS AND A METHOD FOR OUTPUTTING CONTROL INFORMATION

(75) Inventors: Yusuke Shimizu, Tokyo-to (JP); Kaoru Murase, Nara-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 568 days.

(21) Appl. No.: 09/983,264

(22) Filed: Oct. 23, 2001

(65) Prior Publication Data
US 2002/0107832 A1 Aug. 8, 2002

(30) Foreign Application Priority Data
Oct. 23, 2000 (JP) ............... 2000-322295
Jul. 10, 2001 (JP) ............... 2001-209850

(51) Int. Cl.
*G06F 17/30* (2006.01)
*G07F 7/00* (2006.01)
(52) U.S. Cl. ...................................... 705/27
(58) Field of Classification Search ............ 705/27
See application file for complete search history.

(56) References Cited

U.S. PATENT DOCUMENTS 5,754,939 A 5/1998 Herz et al.
6,029,045 A 2/2000 Picco et al.
6,338,044 B1* 1/2002 Cook et al. ............... 705/14
6,446,261 B1* 9/2002 Rosser ....................... 725/34
6,658,568 B1* 12/2003 Ginter et al. ............. 713/193

FOREIGN PATENT DOCUMENTS

EP 0 939 405 9/1999
WO 99 21338 4/1999

OTHER PUBLICATIONS

Patent Abstracts of Japan, entitled "*Video Image and/or Audio Signal Equipment*", vol. 1996, no. 3, Mar. 29, 1996.

* cited by examiner

*Primary Examiner*—James A. Kramer
*Assistant Examiner*—Rajesh Khattar
(74) *Attorney, Agent, or Firm*—Wenderoth, Lind & Ponack, L.L.P.

(57) ABSTRACT

A digital contents providing system selects second digital content to be reproduced along with first digital content which is selected by a user, depending on the individual information of a user such as age, sex, liking, and annual income, and sequentially reproduces the two digital contents as one reproducing stream according to reproducing control information specifying an order of reproducing the data included in both the first digital content and the second digital content.

2 Claims, 13 Drawing Sheets

Fig. 3

| USER IDENTIFIER | AGE | SEX | HOBBY | ANNUAL INCOME |
|---|---|---|---|---|
| 1 | A1 (<18) | S1 (MALE) | H1 (SPORTS) | I1 (<500) |
| 2 | A2 (≧18) | S2 (FEMALE) | H2 (MUSIC) | I2 (<500) |
| 3 | A2 (≧18) | S2 (MALE) | H3 (CAR) | I3 (500~1000) |

Fig. 5

| 2nd CONTENT IDENTIFIER | TARGET AGE | TARGET SEX | LIKING CATEGORY | TARGET ANNUAL INCOME |
|---|---|---|---|---|
| 1 (BASEBALL GAME) | A1 (<18) | S1 (MALE) | H3 (GAME) | I1 (<500) |
| 2 (NEWLY RELEASED CD) | A2 (≧18) | S3 (MALE/FEMALE) | H2 (MUSIC) | I2 (500~1000) |
| 3 (BASEBALL EQUIPMENT) | A3 (LIMIT g1) | S1 (MALE) | H1 (SPORTS) | I1 (<500) |
| 4 (USED CAR INFORMATION MAGAZINE) | A2 (≧18) | S3 (MALE/FEMALE) | H4 (CAR) | I2 (500~1000) |
| 5 (FOREIGN CARS) | A2 (≧18) | S3 (MALE/FEMALE) | H4 (CAR) | I3 (>1000) |
| 6 (COSMETIC) | A2 (≧18) | S2 (FEMALE) | H5 (OTHERS) | I2 (500~1000) |

Fig. 6

USE CONDITION INFORMATION

RENTAL PERIOD : 1 WEEK
NO. TIMES REPRODUCTION IS POSSIBLE : 3
WHETHER COPYING IS ALLOWED : YES
VERSION NO. : 1

Fig. 12

| 2nd CONTENT IDENTIFIER | REPRODUCING TIME PERIOD INSTRUCTION |
|---|---|
| 1 (CIGARETTE) | 22:00~24:00 |
| 2 (BREAD) | 6:00~8:00 |
| 3 (THEME PARK) | NO INSTRUCTION |
| 4 (HOUSING) | 21:00~24:00 |
| 5 (CURRY) | 18:00~20:00 |
| 6 (HOUSE FURNISHINGS) | 9:00~16:00 |

Fig. 13

VERSION 1

Step 1 2nd DIGITAL CONTENT A
Step 2 2nd DIGITAL CONTENT B
Step 3 1st DIGITAL CONTENT

VERSION 2

Step 1 1st DIGITAL CONTENT
Step 2 2nd DIGITAL CONTENT A
Step 3 2nd DIGITAL CONTENT B

VERSION 3

Step 1 PREQUEL OF 1st DIGITAL CONTENT
Step 2 2nd DIGITAL CONTENT A
Step 3 2nd DIGITAL CONTENT B
Step 4 SEQUEL OF 1st DIGITAL CONTENT

APPARATUS AND A METHOD FOR OUTPUTTING CONTROL INFORMATION

BACKGROUND OF THE INVENTION

1. Field of the Invention

This invention relates to an apparatus and a method for outputting control information which controls transactions for reproducing digital contents such as image data and audio data.

2. Description of the Related Art

Digital contents in such forms as movies, music, and broadcast programs consist of digital contents data such as image, audio, and text data. In the conventional digital contents providing system, these digital contents data (hereafter referred to as first digital content) are provided through removable recording media, the Internet, or digital broadcasts.

Second digital contents, also comprised of digital contents data such as image, audio, and text data, include advertisement information on goods and services, and link information to online shopping sites. The second digital contents are usually added to the first digital contents, and are reproduced by the users before and after the reproduction of the first digital contents when the users select to reproduce them.

However, under the above system, second digital content to be added to certain first digital content is already decided by the advertisement sponsor regardless of attributes of users. Accordingly, this causes the problem that some users are forced to receive information which does not meet their interests.

Further, in case that the reproduction of second digital contents depends on users' choice, it causes the problem that the advertisement sponsors are sometimes unable to make users watch the second digital contents which they provided with advertisement at all, when users do not reproduce them.

SUMMARY OF THE INVENTION

The object of the present invention, in view of the stated problems, is to provide an apparatus and a method for selecting second digital contents which provide users with an effective advertisement and for outputting control information to control so that the selected contents can be reproduced in a specified reproducing order without depending on a user's selection. In order to achieve the object, the present invention provides a control information output apparatus including: an information storage unit operable to store individual information of a user; a determination receiving unit operable to receive a user determination of digital content; a selecting unit operable to select, upon receipt of the determination, digital content based on the individual information of the user; a control information generating unit operable to generate control information which specifies an order of reproducing the digital content determined by the user and the digital content selected by the selecting unit; and an output unit operable to output the control information.

In addition, the control information output apparatus may also have one of the following constructions: 1) further including a digital contents storage unit operable to store a plurality of digital contents, wherein the output unit further includes a recording unit operable to record, on a recording medium, the digital content selected from the digital contents storage unit, 2) the recording unit further recording the control information on a recording medium, 3) the individual information including a user identifier and one or more first identifiers showing an attribute of the individual information; the information storage unit storing the user identifier and the first identifiers in correspondence; the digital contents storage unit storing one or more sets of a digital content identifier and one or more second identifiers showing target user attributes of the digital content; the determination receiving unit further receiving a user identifier of the user who determined the digital content, the selecting unit further including: a first specifying unit operable to a) read out the individual Eye information from the information storage unit, and b) specify a first identifier corresponding to the received user identifier; a judging unit operable to judge whether an attribute specified by the first identifier matches an attribute of the second identifiers stored in the second digital contents storage unit; and a second specifying unit operable to specify a digital content identifier which belongs to a set that contains a certain number or more of second identifiers that have been judged to match the attribute by the judging unit, and 4) the output unit further including a recording unit operable to record the control information on a recording medium.

Further, the object of the present invention is also achieved by a digital contents providing system which includes a control information output apparatus and a digital contents reproducing apparatus, the control information output apparatus outputting control information which specifies an order of reproducing digital contents, including: an information storage unit operable to store individual information of a user; a determination receiving unit operable to receive a user determination of digital content; a selecting unit operable to select, upon receipt of the determination, digital content based on the individual information of the user; a control information generating unit operable to generate control information which specifies an order of reproducing the digital content determined by the user and the digital content selected by the selecting unit; and an output unit operable to output the control information, and wherein the digital contents reproducing apparatus includes a reproducing unit operable to reproduce the determined digital content and the selected digital content in the specified reproducing order.

The object of the present invention can also be achieved by a method of outputting control information performed by a control information output apparatus including an information storage unit operable to store individual information of a user, the control information output method including: receiving a user determination of digital content; selecting, upon receipt of the determination, one out of a plurality of digital contents, based on the individual information of a user read out from the information storage unit; generating control information for reproducing the determined digital content and the selected digital content in a specified order; and outputting the generated control information.

The above construction enables a selection of second digital content such as advertisement information, by using individual information of a user as a reference. Moreover, the sequential reproduction of first digital content and a selected second digital content as one reproducing stream is realized, according to the reproduction control information showing the order in which the two digital contents are reproduced. As a result, users can view advertisement information which is of interest to them. Sponsors can provide the target users with the selected second digital contents. In addition, the sponsors can force users to watch the selected digital contents, by coupling them, as one stream, with the corresponding first digital contents that users surely reproduce, which will enhance the effectiveness of the advertisement.

Here, the present invention can also provide a digital contents providing system, wherein the control information output apparatus includes an advertisement usage information generating unit operable to generate advertisement usage information of the selected content including reproduction history information, the digital contents reproducing apparatus includes an updating unit operable to update the reproduction history information every time the selected digital content is reproduced by the reproducing apparatus, and the control information output apparatus includes a control information storage unit operable to store the updated advertisement usage information.

Further in the digital contents providing system, the digital content may further contain link information used for linking to an online shopping website, and the advertisement usage information may include a record of the number of times the user has accessed the website, and a purchase record of the user on the website, and the updating unit may update, every time the user accesses the website or purchases on the website, the advertisement usage information.

Still further in the digital contents providing system, the control information output apparatus may include an advertisement usage information generating unit operable to generate advertisement usage information of the selected content including reproduction history information, the digital contents reproducing apparatus may include an updating unit operable to update the reproduction history information every time the selected digital content is reproduced by the reproducing apparatus, and the control information output apparatus may include a control information storage unit operable to store the updated advertisement usage information.

According to this structure, the advertisement sponsors can obtain information on how the advertisement information which is provided to users is actually used. This helps advertisement sponsors to adequately estimate the effectiveness of the advertisement information that they provided.

Here, the digital contents providing system may further connect, by a communications circuit, the control information output apparatus to the digital contents reproducing apparatus.

According to the above constructions, rental shops no longer have to output and distribute control information to users, which used to be necessary every time users rented first digital contents.

Here, the control information output apparatus may further include a distributing unit operable to distribute the determined digital content to the digital contents reproducing apparatus via the communications circuit.

According to the above construction, users can view the first digital contents of their choice without going to rental shops.

Here, the object of the present invention can also be achieved by a digital contents reproducing apparatus including: a receiving unit operable to receive first digital content sent from a broadcasting station; an information storage unit operable to store second digital contents; a table retaining unit operable to retain a table showing correspondence between a second digital content identifier and a corresponding determined reproducing time period; a time acquiring unit operable to acquire a time when reproduction control information which instructs a timing for reproducing second digital content is detected from the received first digital content; a selecting unit operable to select a second digital content identifier corresponding to a determined reproducing time period in which the acquired time is included; and a reproducing unit operable to read the second digital content corresponding to the selected second digital content identifier and to reproduce the read second digital content.

Further, the object of the present invention can also be achieved by a digital contents reproducing method performed by a digital contents reproducing apparatus including an information storage unit operable to store second digital contents, the digital contents reproducing method including: receiving first digital content sent from a broadcasting station; retaining a table showing correspondence between a second digital content identifier and a corresponding determined reproducing time period; acquiring a time when reproduction control information which instructs a timing for reproducing second digital content is detected from the received first digital content; selecting a second digital content identifier corresponding to a determined reproducing time period in which the acquired time is included; and reading second digital content corresponding to the selected second digital content identifier from the information storage unit and reproducing the read second digital content.

The above construction enables the selection of the second digital content consisting of advertisement information to be based on the time in which the reproduction control information showing the reproducing timing of the advertisement information is detected. Accordingly, users do not have to watch advertisement information that is not suitable for the time period. Also, advertisement sponsors can enhance the effectiveness of the advertisement, since the system can provide users with the advertisement information on goods and services at a proper timing.

DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 shows an example of a first identifier of individual information;

FIG. 5 is an example of a table which shows correspondence between second content identifiers and corresponding second identifiers;

FIG. 6 is an example of use condition information;

FIG. 12 is an example of a table stored in a second digital contents storage unit 811;

and FIG. 13 is an example of reproduction control information which stores reproducing orders for first and second digital contents for each version number.

DESCRIPTION OF THE PREFERRED EMBODIMENTS

The following is a description of the embodiments that the present invention is applied to, with reference to the drawings.

First Embodiment

Figure 1:
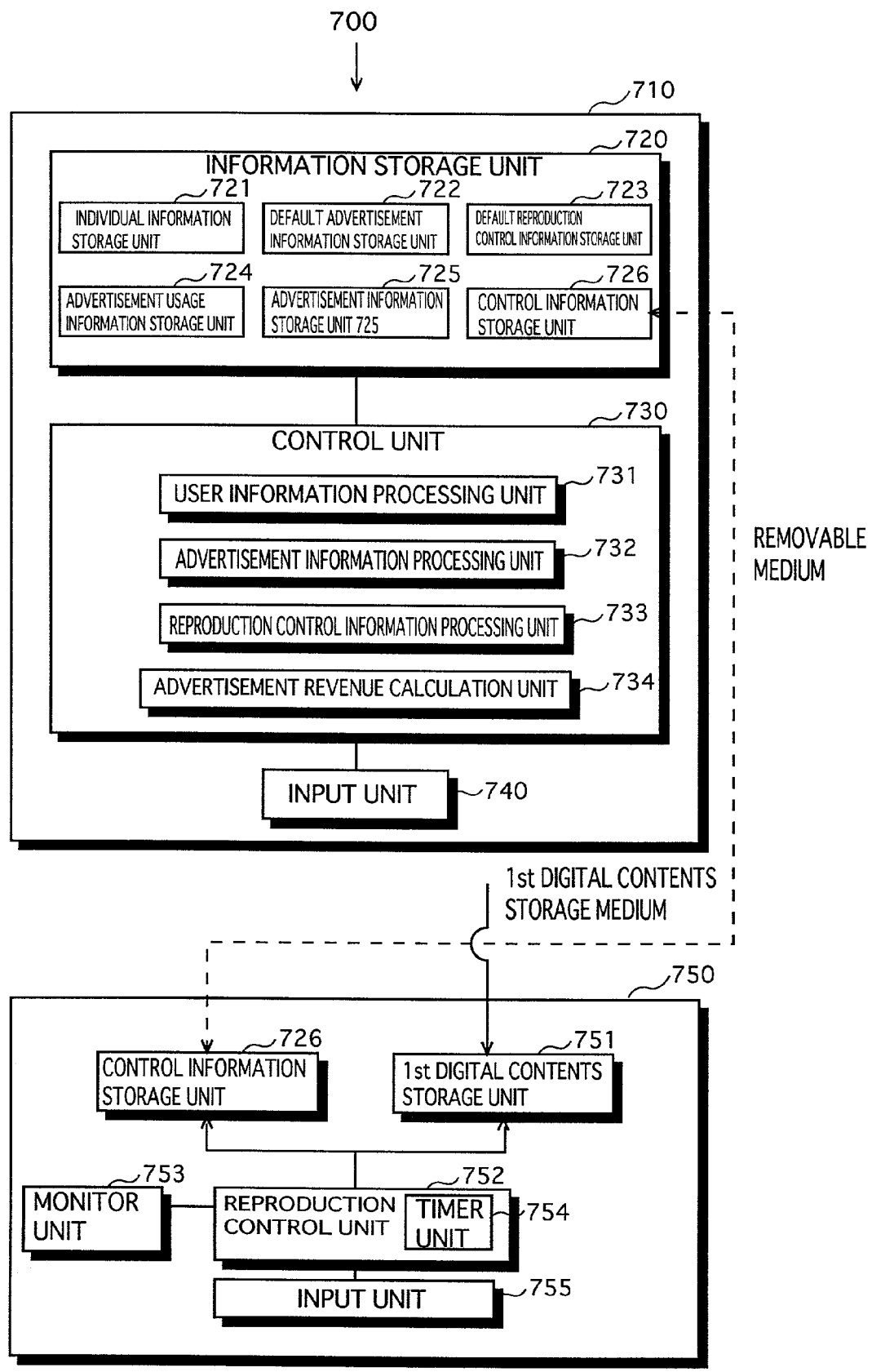
FIG. 1 is a functional block diagram showing a construction of a digital contents providing system 700.

FIG. 1 is a functional block chart showing the construction of the digital contents providing system 700 which is an embodiment of the present invention.

The digital contents providing system 700 selects second digital content to be reproduced along with first digital content, based on each user's individual information such as age, sex, liking, and annual income as a reference. The digital contents providing system 700, then, reproduces the first and the second digital contents data as one reproducing stream, in accordance with the reproduction control information which shows the order of the digital contents data included in the first digital content and the selected second digital content. Specifically, the digital contents providing system 700 is comprised of an output apparatus 710 and a reproducing apparatus 750. The output apparatus 710 outputs the second digital content and the reproduction control information and the reproducing apparatus 750 reproduces the first and the second digital contents according to the reproduction control information.

The reproduction control information is generated based on first digital content and default reproduction control information which shows the order of reproducing the first digital content and also the second digital content which is associated, according to the instruction from the advertisement sponsor, with the first digital content (hereafter, this second digital content being referred to as "default content"). Specifically, the reproduction control information is generated by replacing the information showing the order of reproducing the default content stored in the default reproduction control information with the information showing the order of reproducing the second digital content which has been actually selected.

Here, the default reproduction control information shows the order of reproducing the first digital content and the default content, and a recording procedure of advertisement usage information which will be mentioned later.

Figure 2:
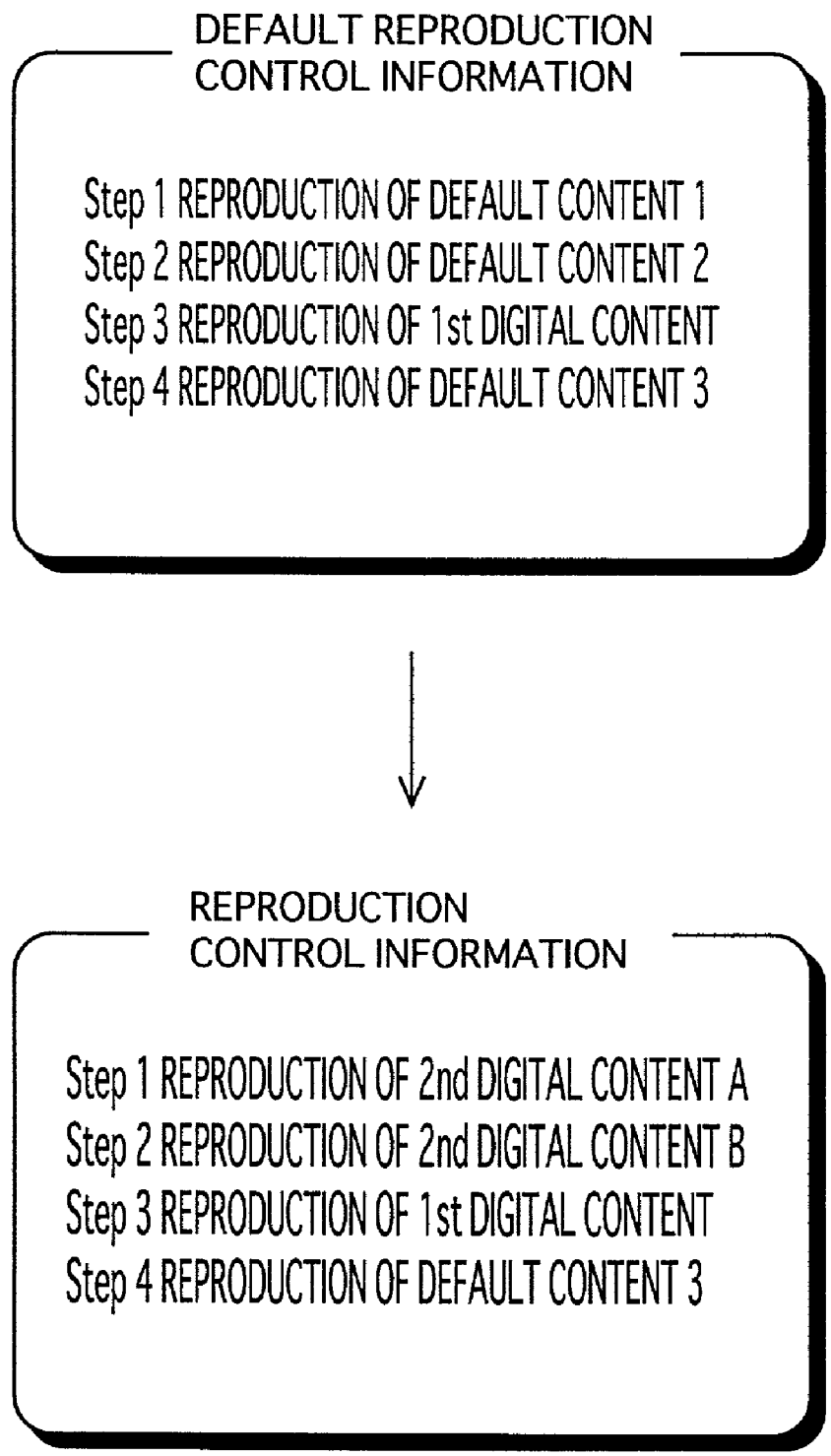
FIG. 2 is an example of default reproduction control information and reproduction control information generated according to default reproduction control information.

FIG. 2 shows examples of the default reproduction control information and the reproduction control information generated based on the default reproduction control information. In the example of FIG. 2, the default reproduction control information is rewritten to generate reproduction control information, by replacing the reproducing order for default contents 1 and 2 in the default reproduction control information with that for second digital contents A and B. In addition, although not shown in FIG. 2, the generated reproduction control information includes information showing the recording procedure of the advertisement usage information initially contained in the default reproduction control information.

The output apparatus 710 is used to output, in a DVD-rental shop for example, second digital content such as advertisement information to be reproduced along with a DVD content in which first digital content has been recorded. Accordingly, the reproducing apparatus 750 is used to reproduce the first digital content in the DVD as well as the second digital content output from the output apparatus 710.

The output apparatus 710 consists of a CPU, ROM, RAM, a hard disk unit, a removable medium such as a flexible disk or a memory card, a keyboard, a mouse, and a monitor and others. The output apparatus 710 has an input unit 740, an information storage unit 720, and a control unit 730.

The mentioned ROM or the hard disk unit stores computer program. The output apparatus performs its function by making the CPU operate according to the computer program.

Various types of information and instructions are input, by an operator such as a clerk of a DVD-rental shop, to the input unit 740.

The information storage unit 720 consists of an individual information storage unit 721, a default advertisement information storage unit 722, a default reproduction control information storage unit 723, an advertisement usage information storage unit 724, an advertisement information storage unit 725, and a control information storage unit 726.

The individual information storage unit 721 stores each user's individual information. Here, the individual information includes information on a user identifier, age, sex, liking, or annual income for each user.

Specifically, each type of the individual information is grouped and each group being assigned an identifier (a first identifier). For example, age is divided into two groups; above or equal to 18 years old, and below 18 years old. Sex can be grouped into male and female. Liking, such as hobbies, has 5 categories such as sports, music, games, cars, and others, for example. Annual income is grouped into 3 types; below 5 million yen, above or equal to 5 million and below 10 million, and above or equal to 10 million yen. The individual information storage unit 721 stores each user identifier and their corresponding first identifiers.

FIG. 3 is an example of the first identifiers resulting from grouping the individual information according to the above method. Individual information is provided from users, for example, when the users become a customer member of the DVD-rental shop. Note that the information with parentheses in FIG. 3 is assigned for clarification of the meaning of each identifier and is not included in the actual individual information.

The default advertisement information storage unit 722 stores default contents and the first digital content identifiers in correspondence.

The default reproduction control information storage unit 723 stores default reproduction control information. The default reproduction control information storage unit 723 stores default reproduction control information the first digital content identifiers in correspondence.

Figure 4:
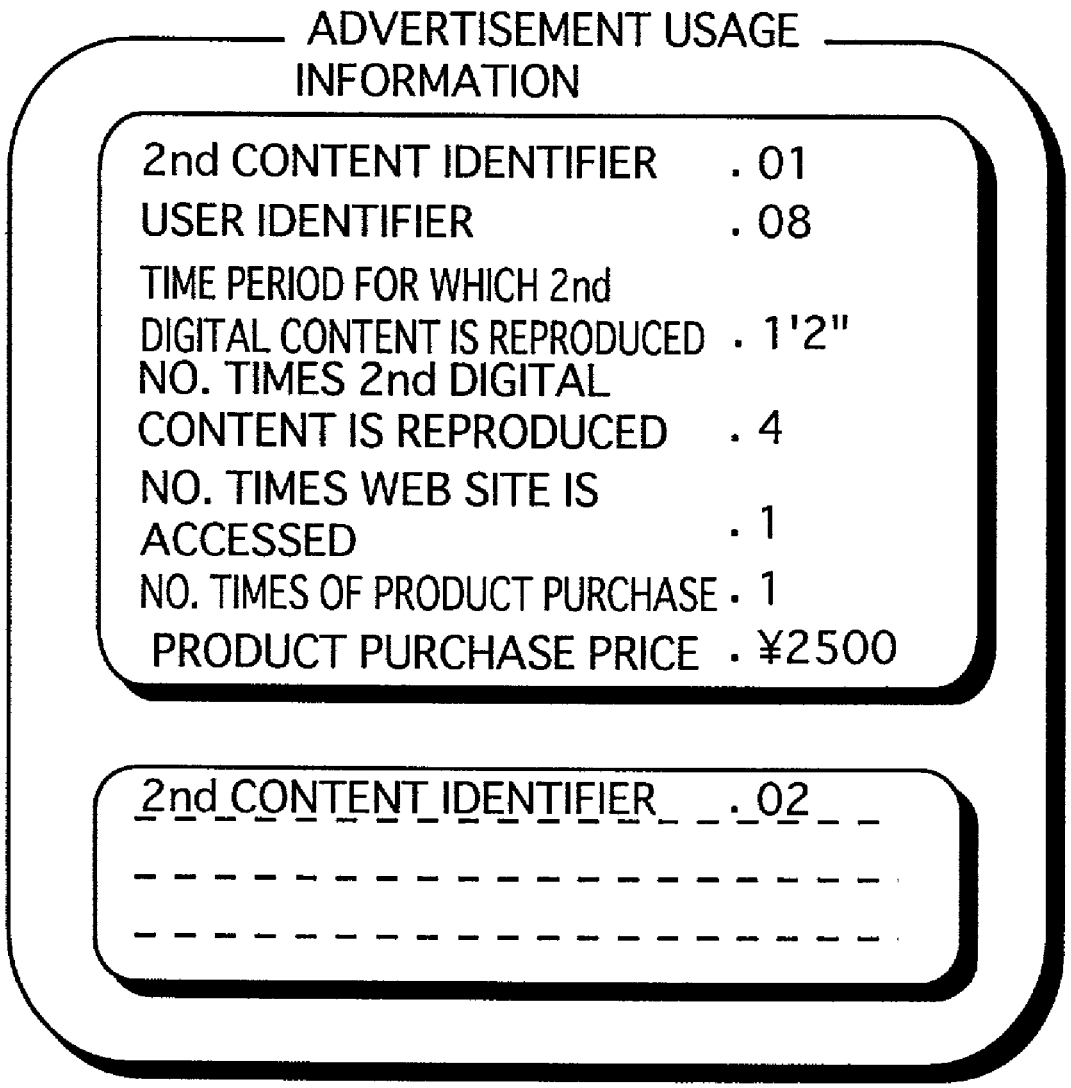
FIG. 4 shows an example of advertisement usage information.

The advertisement usage information storage unit 724 stores advertisement usage information. Here, the advertisement usage information includes various types of information such as identifiers for second digital contents (second content identifier), user identifiers, time period for which the second digital contents are reproduced, number of times the second digital contents are reproduced, number of times linking websites for online shopping are accessed using the link information contained in the second digital contents, number of times the products displayed on the accessed websites are purchased, and the purchase prices, etc. FIG. 4 shows an example for the advertisement usage information.

The advertisement information storage unit 725 stores the second digital contents provided by advertisement sponsors. Specifically, the advertisement information storage unit 725 stores a table which shows each correspondence between a second content identifier and attributes of a user which the second digital content is intended for (such as age, sex, liking, and annual income, etc.) expressed in the form of identifier (second identifier). Also stored are the second digital contents and the second content identifiers in correspondence. FIG. 5 is an example of the above-mentioned table. The information with parentheses in FIG. 5 is provided for clarifying the advertisement information of the second digital contents, and not included in the actual table.

Here, each of the second identifiers is assigned the common identifier to the first identifier. For example, as shown in FIG. 3 and FIG. 5, both the first and the second identifiers use the same identifier for identifying age, which are A1 and A2. Note that for the second identifier, A3 is added which includes both A1 and A2 (which means that it has no age limit). Likewise, for other user attributes, the first and the second identifiers are assigned common identifiers.

The control information storage unit 726 stores reproduction control information replaced by the control unit 730 (which will be described later), the selected second digital content, the generated advertisement usage information, use conditions and billing information, both of which will be described later. The control information storage unit 726 consists of a removable medium such as a flexible disk or a memory card. Such a removable medium is removed from the information storage unit 720 at the DVD-rental shop, when the users rent the DVD in which the first digital content is recorded.

The control unit 730 consists of a user information processing unit 731, an advertisement information processing unit 732, a reproduction controlling information processing unit 733, and an advertisement revenue calculation unit 734.

The user information processing unit 731 receives each first identifier of individual information input through the input unit 740 from a clerk of a DVD-rental shop upon the user becoming a customer member of the shop. Then, the user information processing unit 731 stores the received first identifier in the individual information storage unit 721. It then generates use condition information based on the use conditions which is instructed by a user and input by a clerks for example, such as for a period of rent, number of times the reproduction is possible, or whether copying is allowed or not. Then, rental price is calculated using the generated use condition information. This calculated rental price is then used to generate billing information mentioned earlier. Lastly, the generated use condition information and the billing information are recorded in the control information storage unit 726.

FIG. 6 is an example of the generated use condition information. Here, the use condition information shows such information as a rental period, number of times the reproduction is possible, whether copying is allowed or not, and a version number that a user instructed.

The "rental period" shows such information as the period for which the first digital content is rent. "Number of times the reproduction is possible" is information which shows a user instruction on how many times the reproducing apparatus 750 can reproduce the rented first digital content. "Whether copying is allowed or not" is information which shows a user instruction on whether the user chooses to copy the first digital content to a hard disk or other media. "The version number" is, for example, information which shows a user instruction on the version to be reproduced; whether the complete version, the theater version, or the director's cut version.

The reproduction control information contains information on the reproducing orders of the digital contents data in the first digital content for each version number. The reproducing apparatus 750 reproduces the first digital content according to the reproducing order specified by the reproduction control information so as to be in accordance with the version number specified in the use condition information.

The advertisement information processing unit 732 receives the user identifier and the first digital content identifier identifying the first digital content that user wants to rent that is input through the input unit 740 by a clerk of the DVD-rental shop for example, at the time of the user renting the first digital content. Then, the advertisement information processing unit 732 reads, from the individual information storage unit 721, each first identifier included in the individual information which corresponds to the received user identifier. Finally, the advertisement information processing unit 732 reads each second identifier which corresponds to each of the second content identifier stored in the advertisement information storage 725, then compares the first identifier and the corresponding second identifier (i.e. compares the two identifiers both on age, or compares those on sex) and sees whether the two match or not.

Here, "to match" means, when comparing the two identifiers, that the attributes that the first and the second identifiers identify overlap. For example, if the first identifier shows that the age is under 18 years old, then a second identifier which either shows under 18 years old, or shows no age limit is considered to match the first identifier.

The advertisement information processing unit 732 selects, from the table in the advertisement information storage unit 725, second digital content which includes second content identifier having at least two second identifiers matching those of the first identifiers. The advertisement information processing unit 732, after reading the selected second digital content, stores the content in the control information storage unit 726. When the second content identifiers are not included in the table of the advertisement information storage unit 725, the advertisement information processing unit 732 selects and reads the default content, from the default advertisement information storage unit 722, that corresponds to the identifier of the first digital content of the user's choice.

Moreover, the advertisement information processing unit 732 generates advertisement usage information for the selected second digital content or for the selected default content, and stores the generated advertisement usage information in the control information storage unit 726.

When the advertisement information processing unit 732 selects the second digital content from the advertisement information storage unit 725, the reproduction control information processing unit 733 reads default reproduction control information which corresponds to the identifier of the first digital content of the user's choice from the default reproduction control information storage unit 723, and replaces the order of reproducing the default content in the default reproduction control information with the order of reproducing the second digital content selected from the advertisement information storage unit 725. The reproduction control information processing unit 733, then, generates reproduction control information and stores it in the control information storage unit 726.

The advertisement revenue calculation unit 734, upon receiving an instruction for calculation, calculates the advertisement cost, referring to the individual information stored in the individual information storage unit 721 and the advertisement usage information stored in the advertisement usage information storage unit 724. Specifically, advertisement revenue (I) for each second digital content is calculated using the following expression:

Advertisement revenue (I)=purchasing power of a user (A)*(number of times the second digital content is reproduced (B)+number of times online shopping websites are accessed (C))+total purchase expense spent on the website (D) * execution coefficient (E)

The above expression incorporates the number of times the user used the second digital content into the advertisement revenue.

Here, the purchasing power (A) bases its calculation on the annual income in the individual information, and is calculated by the control unit 730 at the time of storing the individual information in the individual information storage unit 721 in such a method as multiplying the annual income by a coefficient, for example. The calculated purchasing power (A) is stored, with other individual information identifiers in correspondence, in the individual information storage unit 721. The execution coefficient (E) defines the ratio of success revenue which is added to (I) to the total purchase expense spent on the website (D). The coefficient can be a constant. Or the coefficient can be changed according to the types of product or the price thereof. In this embodiment, (E) is assumed to be a constant whose value is 0.002 regardless of the types of product or the price.

The following is a description of the transaction performed by the advertisement revenue calculation unit 734, in order to calculate the advertisement revenue from the second digital content a, taking an example of the second digital content a.

The advertisement revenue calculation unit 734 reads out, from the advertisement usage information storage unit 724, (B), (C), and (D), each corresponding to each user identifier corresponding to the second digital content a. Then, the advertisement revenue calculation unit 734 counts the number of the user identifiers that correspond to the second digital content a. Then, (A) corresponding to each user identifier is read out from the individual information storage unit 721. Finally, the advertisement revenue for the second digital content a is calculated by substituting (A), (B), (C), and (D) into the above expression for each user.

The total advertisement revenue for the second digital content a is calculated by adding every advertisement revenue for each user. Then, number of users of the second digital content a is calculated from the total number of the user identifiers.

The reproducing apparatus 750 comprises a CPU, RAM, ROM, a hard disk unit, a CD drive, a removable medium such as a flexible disk or a memory card, input-output apparatuses such as a decoder, a key board, a mouse, a remote control, and a monitor, and a modem. Specifically, the reproducing apparatus 750 includes a first digital contents storage unit 751, a reproduction control unit 752, a control information storage unit 726, a monitor unit 753, and an input unit 755.

The ROM or the hard disk unit described above stores computer program. By making the CPU operate according to the computer program, the reproducing apparatus 750 performs its function. Further, the reproducing apparatus is connected to the Internet through a dialup.

The first digital contents storage unit 751 stores the first digital contents. The first digital contents storage unit 751 consists of a removable medium such as a DVD.

The reproduction control unit 752 includes a timer unit 754 for counting time, and it updates use condition information and billing information stored in the control information storage unit 726. In addition, the reproduction control unit 752 reproduces the first and the second digital contents, and updates advertisement usage information stored in the control information storage unit 726.

First, transaction for updating the use condition information and the billing information is described. The reproduction control unit 752, upon receipt of the updating instruction from the input unit 724, reads out the use condition information from the control information storage unit 726, and updates the specified use condition information. Further, the reproduction control unit 752 reads out the billing information from the control information storage unit 726 and calculates the rental charge based on the updated specified use condition information, and updates the billing information based on the calculated rental charge.

Next, the transaction for reproducing performed by the reproduction control unit 752 is described.

The reproduction control unit 752, upon receipt of the user's reproduction instruction from the input unit 755, reads out the reproduction control information and the second digital content stored in the control information storage unit 726. The reproduction control unit 752 also reads out the first digital content stored in the first digital contents storage unit 751, then reproduces the first and the second digital contents sequentially as one reproducing stream according to the reproducing order specified by the reproduction control information.

Next, the transaction for updating the advertisement usage information in the control information storage unit 726 performed by the reproduction control unit 752 is described.

The reproduction control unit 752 updates, every time the second digital content is reproduced, information on the number of times the advertisement usage information is updated, according to the recording procedure of the advertisement usage information shown by the reproduction control information. Then, the reproduction control unit 752 makes the timer unit 754 to count the reproducing time, and it receives, after the reproduction is finished, the reproducing time counted by the timer unit 754, and updates the reproducing time stored in the advertisement usage information.

If the second digital content is link information to the online shopping website, the reproduction control unit 752 accesses the online shopping website according to the link information through the web server, and updates the number of access to the website whose information is stored in the advertisement usage information. It then receives a website page sent from the web server and displays the result on the monitor unit 753. When the purchase order from a user is received on the goods or services displayed on the website, the reproduction control unit 752 updates the number of times of purchases and the purchase price of the goods and services stored in the advertisement usage information, and sends the purchase order to the web server.

Figure 7:
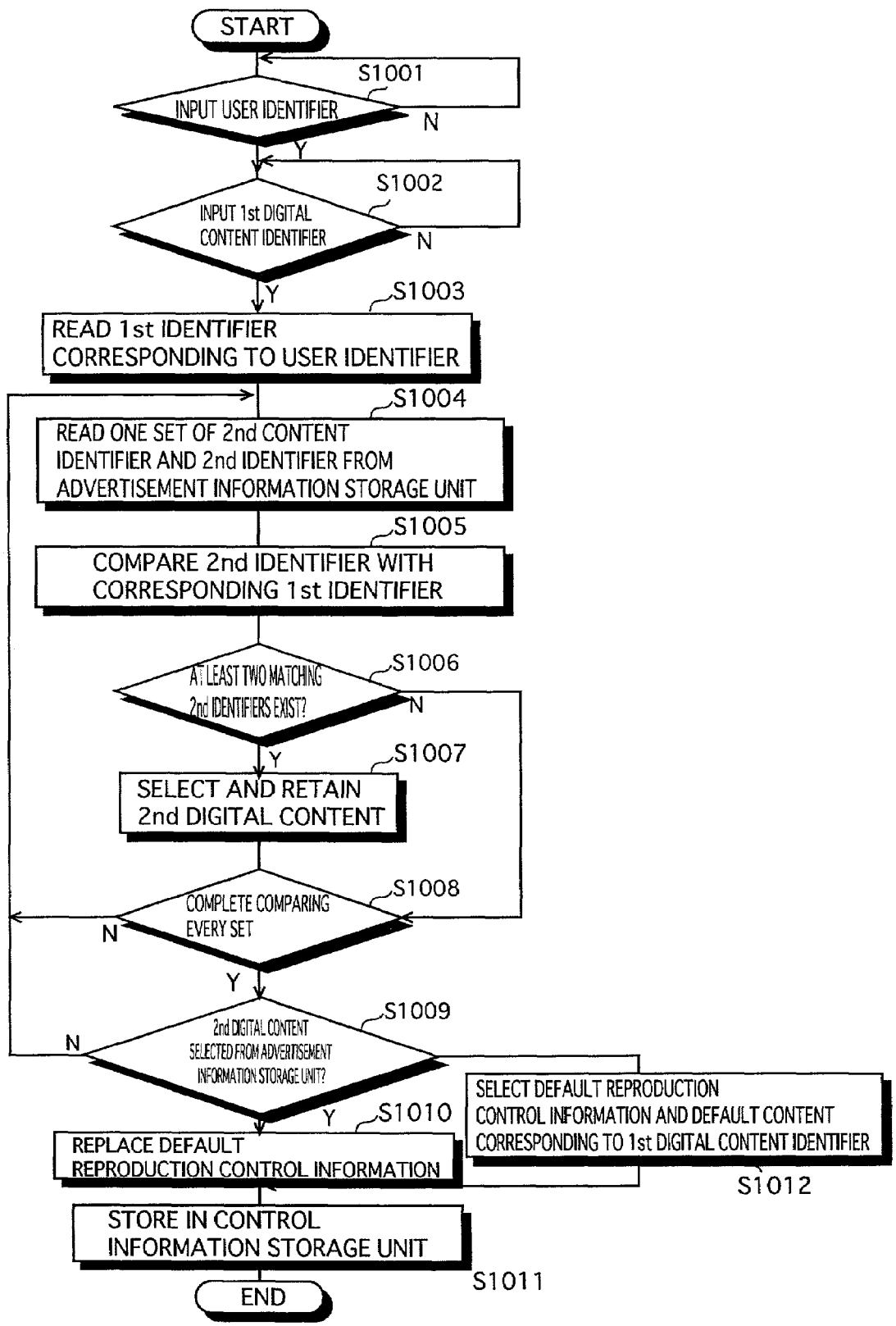
FIG. 7 is a flow chart showing a transaction performed by a control unit 730, so as to select second digital content to be stored in a control information storage unit 726.

Next, the transaction performed by the control unit 730 in order to select second digital content is described. FIG. 7 is a flow chart showing the transaction performed by the control unit 730, for selecting the second digital contents to be stored in the control information storage unit 726. The following is a description on the above transaction referring to the flow chart in FIG. 7.

The advertisement information processing unit 732, upon receiving the user identifier and the identifier for the first digital contents of the user's choice, both being input through the input unit 740 by a clerk of the rental shop (Step S1001:Y, Step S1002:Y), reads out the-first identifier corresponding to the user identifier from the individual information storage unit 721 (Step S1003). The advertisement information processing unit 732 further reads out one set of the second content identifier and the second identifier (Step S1004), compares the corresponding first identifier and second identifier (Step S1005), judges whether at least two matching second identifiers exist that match each corresponding first identifier (Step S1006), and if they exist (Step S1006:Y), selects and retains the second digital content identified by the second content identifiers (Step S1007), and judges whether the comparison is completed for every set retained in the table (Step S1008).

When it is not completed (Step S1008:N), repeats the steps S1004 through S1008.

When it is completed (Step S1008:Y), the reproduction control information processing unit 733 judges whether or not the second digital content is selected from the advertisement information storage unit 725 (Step S1009).

When it is judged to be selected (Step S1009:Y), the reproduction control information processing unit 733 selects the default reproduction control information which corresponds to the first digital content identifier from the default reproduction control information storage unit 723, and replaces the reproducing order for the default content stored in the default reproduction control information with the reproducing order for the second digital content selected and retained in Step S1007 (Step S1010), and stores the replaced reproduction control information and the selected and retained second digital content in the control information storage unit 726 (Step S1011).

If judged not to be selected (Step S1009:N), the reproduction control information processing unit 733 selects the default content corresponding to the selected first digital content identifier from the default advertisement information storage unit 722, reads out the default content, and selects, from the default reproduction control information storage unit 723, the default reproduction control information which corresponds to the first digital content identifier, then reads out the default reproduction control information (Step S1012), finally stores the default content and the default reproduction control information in the control information storage unit 726 (Step S1011).

For example, if the user whose user identifier is 1 in the example of FIG. 3, the advertisement information processing unit 732, in step S1003, reads out A1, S1, H1, I1, each being first identifier identifying age, sex, hobby, and annual income respectively. In Step S1004, the advertisement information processing unit 732 reads out a set of second content identifier and second identifier whose second content identifier is 1 (i.e. A1, S1, H3, and I1) from the table shown in FIG. 5 retained in the advertisement information storage unit 725, and in Step S1005, it compares the first identifier and the second identifier (i.e. compare A1 and A1, S1 and S1, H1 and H3, and I1 and I1), and in Step S1006, judges that number of the matching second identifiers with the corresponding first identifier is 3, and finally in Step S1007, selects and retains the second digital content whose second content identifier is 1.

The advertisement information processing unit 732 performs the same transaction as the above for each set whose second content identifier is 2-6 shown in the table of FIG. 5, and selects and retains the second digital content whose second content identifier is 3.

Figure 8:
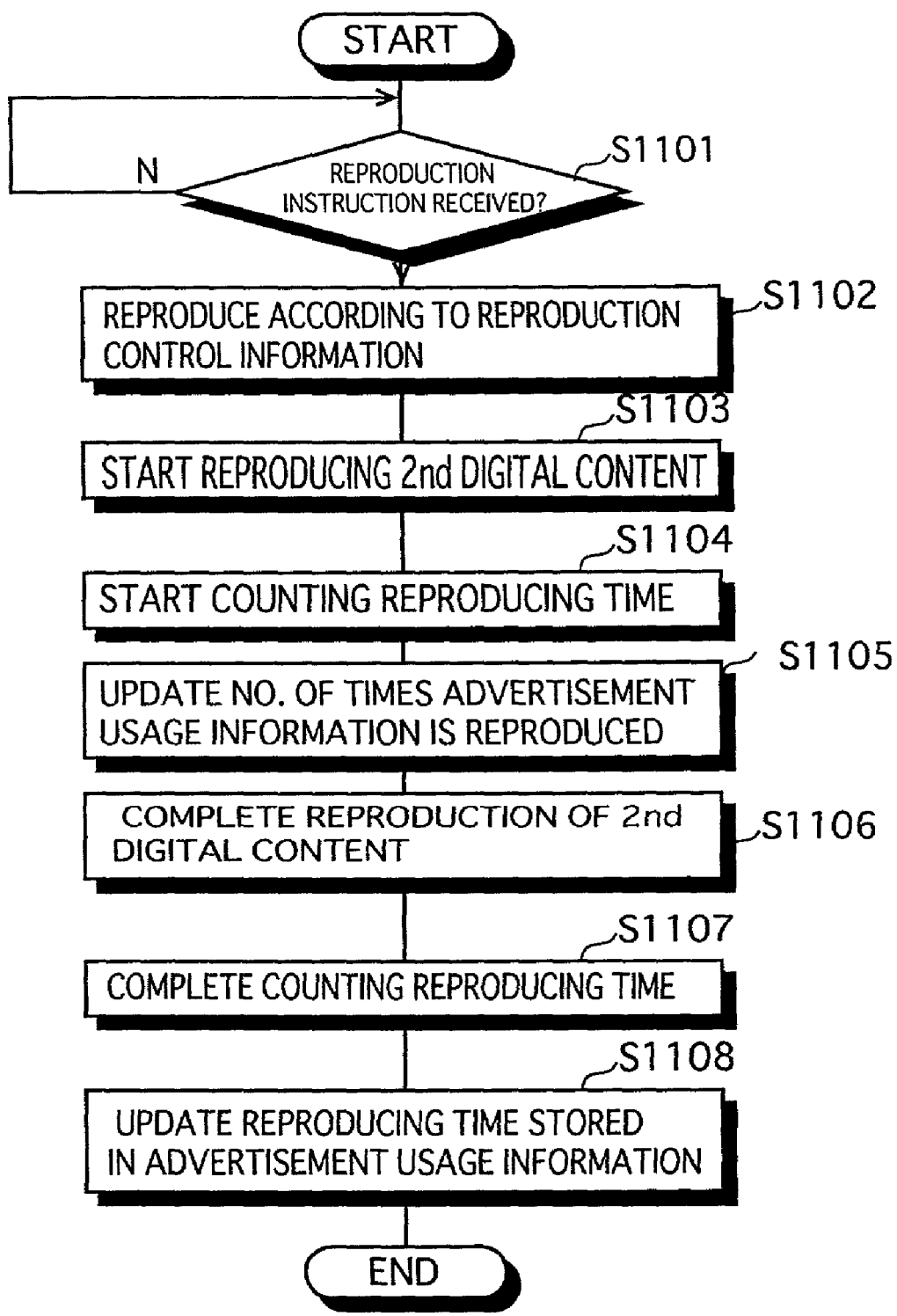
FIG. 8 is a flow chart showing a transaction, performed by a reproduction control unit 752, for updating advertisement usage information stored in a control information storage unit 726, when the second digital content is not link information to an online shopping website.

Next, the transaction is described that the reproduction control unit 752 executes for updating the advertisement usage information stored in the control information storage unit 726. FIG. 8 is a flow chart showing the flow of the transaction for updating the advertisement usage information stored in the control information storage unit 726 performed by the reproduction control unit 752 when the second digital content is not link information to an online shopping website. The following describes the flow of the transaction in details with reference to FIG. 8.

The reproduction control unit 752, upon receiving the reproduction instruction of the first and the second digital contents (Step S1101), reads out the reproduction control information and the second digital content from the control information storage unit 726, and the first digital content from the first digital contents storage unit 751. It then reproduces the first and the second digital contents according to the reproducing order specified by the reproduction control information (Step S1102), and has the timer unit 754 start counting the reproducing time (Step S1104), reads out the advertisement usage information from the control information storage unit 726 according to the recording procedure for the advertisement usage information shown by the reproduction control information, then updates the number of times of reproduction stored in the advertisement usage information (Step S1105), and completes the reproduction of the second digital content (Step S1106), then, makes the timer unit 754 to stop counting the reproducing time (Step S1107), and reads out the advertisement usage information from the control information storage unit 726, then updates the reproducing time of the advertisement usage information by adding the reproduction counted by the timer unit 754 to the reproducing time recorded in the advertisement usage information (Step S1108).

Figure 9:
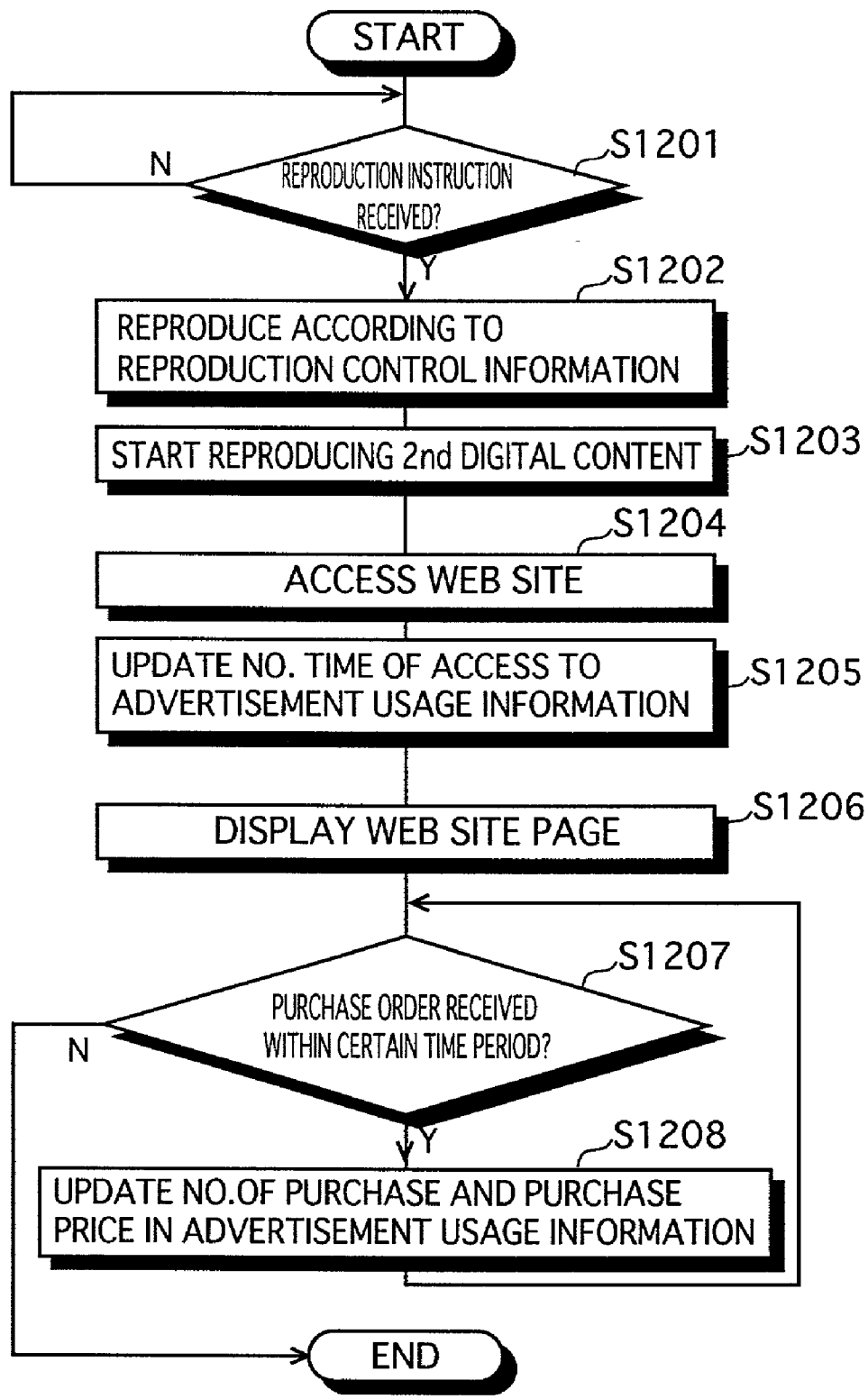
FIG. 9 is a flow chart showing a transaction, performed by the reproduction control unit 752, for updating advertisement usage information stored in a control information storage unit 726, when the second digital content is link information to an online shopping website.

FIG. 9 is a flow chart showing, when the second digital content is link information to an online-shopping website, the flow of the transaction for updating the advertisement usage information stored in the control information storage unit 726 performed by the reproduction control unit 752. The following is a description of the flow of the above transaction with reference to FIG. 9.

The reproduction control unit 752, upon receipt of a user instruction for reproducing the first and the second digital contents (Step S1201), reads out the reproduction control information and the second digital content from the control information storage unit 726, then the first digital content from the first digital contents storage unit 751, and reproduces the first and the second digital contents according to the reproducing order shown by the reproduction control information (Step S1202). When, it starts the reproduction of the second digital content (Step S1203), it accesses the online-shopping website through the web server according to the link information (Step S1204), reads out the advertisement usage information from the control information storage unit 726 according to the recording procedure of the advertisement usage information shown by the reproduction control information to update the number of accesses to the website recorded in the advertisement usage information (Step S1205), displays, on the monitor unit 753, the page of the online shopping site sent from the web server (Step S1206), and upon receipt of the purchase order of the goods or services in the advertisement usage information within a certain period of time after displaying (Step S1207:Y), updates both the purchase price and the information on the number of purchase for the purchased goods or services (Step S1208), and sends the purchase order to the web server. If the user did not give a purchase order (Step S1207:N), the reproduction control unit 752 stops the transaction for updating the advertisement usage information.

As seen Seen from the above description, the digital contents providing system of the embodiment of the present invention enables to select the second digital content which includes advertisement information, with reference to users' individual information such as age, sex, liking, or annual income. The digital contents providing system also enables users to reproduce sequentially the first and the second digital contents as one reproducing stream, according to the reproduction control information instructing the order of reproducing the data contained in these two digital contents. In addition, advertisement sponsors are able to enhance the effectiveness of the advertisement since the users are forced to watch the second digital contents due to the sequential reproduction of the second digital contents and the first digital contents that are ensured to be reproduced.

Second Embodiment

Figure 10:
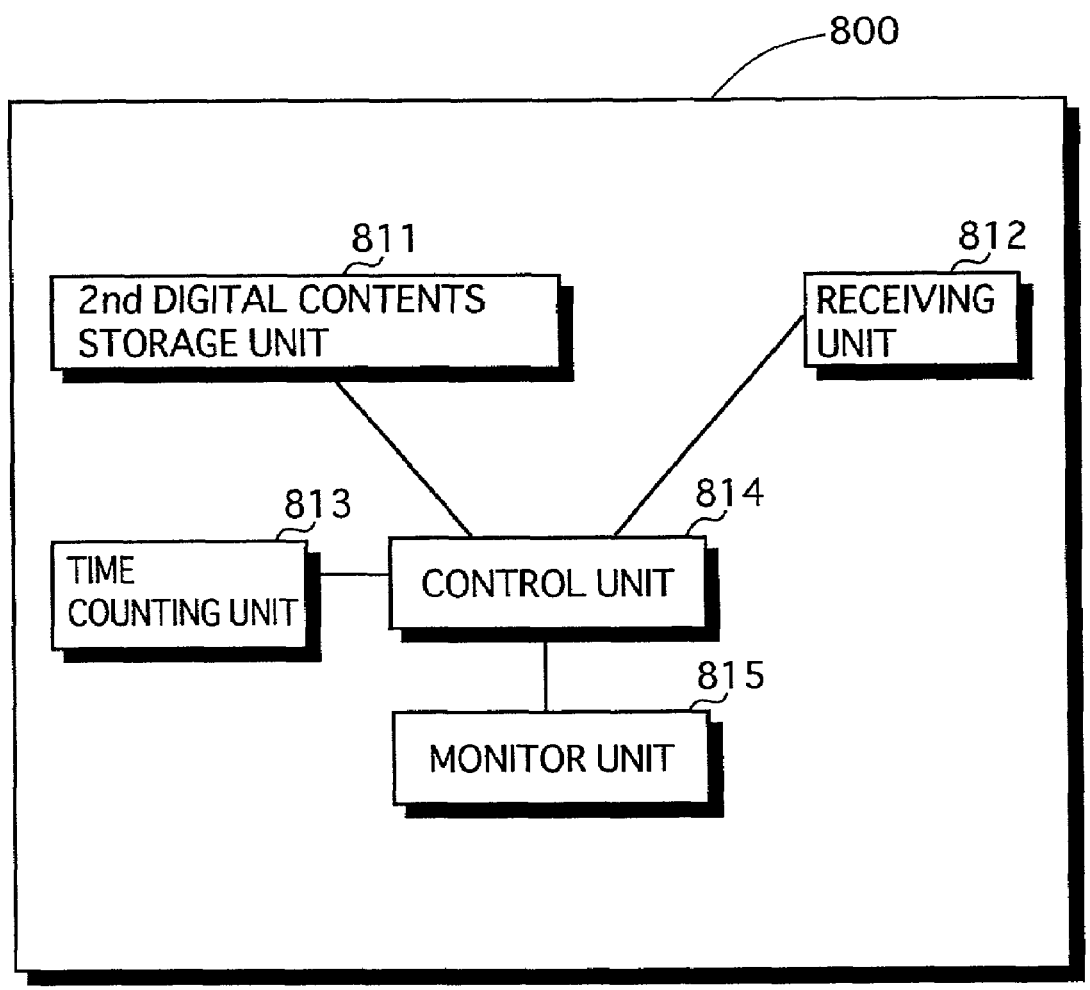
FIG. 10 is a functional block chart showing the construction of a digital contents reproduction apparatus 800.

FIG. 10 is a functional block diagram showing the construction of the digital contents reproducing apparatus 800 that is another embodiment of the present invention. This digital contents reproducing apparatus 800, upon detecting reproduction instruction information which instructs the timing for reproducing the advertisement information and is distributed with first digital content consisting of program through the digital broadcasting from a broadcasting station, is structured to select a corresponding second digital content based on the time when the reproduction instruction information is detected. Then, the digital contents reproducing apparatus 800 is to reproduce and output the selected second digital content. Specifically, this digital contents reproducing apparatus 800 consists of a digital contents storage unit 811, a receiving unit 812, a time counting unit 813, a controlling unit 814, and a monitor unit 815.

The digital contents reproducing apparatus 800 comprises such devices as a micro processor, ROM, RAM, a hard disk unit, a tuner, a demultiplexer, a decoder, and a monitor. The ROM or the hard disk unit stores computer program. The apparatus realizes its function by making the micro processor operate according to the computer program.

The second digital contents storage unit 811 records a table showing correspondence between a second content identifier which identifies the second digital content, and the specified reproducing time period for the second digital content. In addition, the second digital contents storage unit 811 stores the provided second digital content which has correspondence with the second digital content identifier.

The receiving unit 812, upon receipt of a digital broadcast wave sent from a broadcasting station, decodes the received broadcast wave to a transport stream which consists of digital data, and then outputs the digital data to the control unit 814.

The time counting unit 813 counts the time, and outputs the counted time to the control unit 814 upon receipt of the instruction from the control unit.

The control unit 814 divides the output transport stream into image data and audio data, both being consisting elements of the first digital content. The control unit 814 then decodes the image data and the audio data into image signals and audio signals respectively, and finally outputs the signals to the monitor unit 815.

Further, the control unit 814, when detecting, inside the separated digital data from the transport stream, reproduction instruction information instructing the reproduction of the second digital content, receives the time from the time counting unit 813, reads out the table from the second digital contents storage unit 811, selects the second content identifier specifying the instructed reproducing time period which includes the detected time, reads out the second digital content which is specified by the selected second content identifier from the second digital contents storage unit 811, and decodes the second digital content, and after decoding it into image signals and audio signals, it outputs the signals to the monitor unit 815.

The monitor unit 815, consisting of a monitor, displays the digital content output from the control unit 814.

Figure 11:
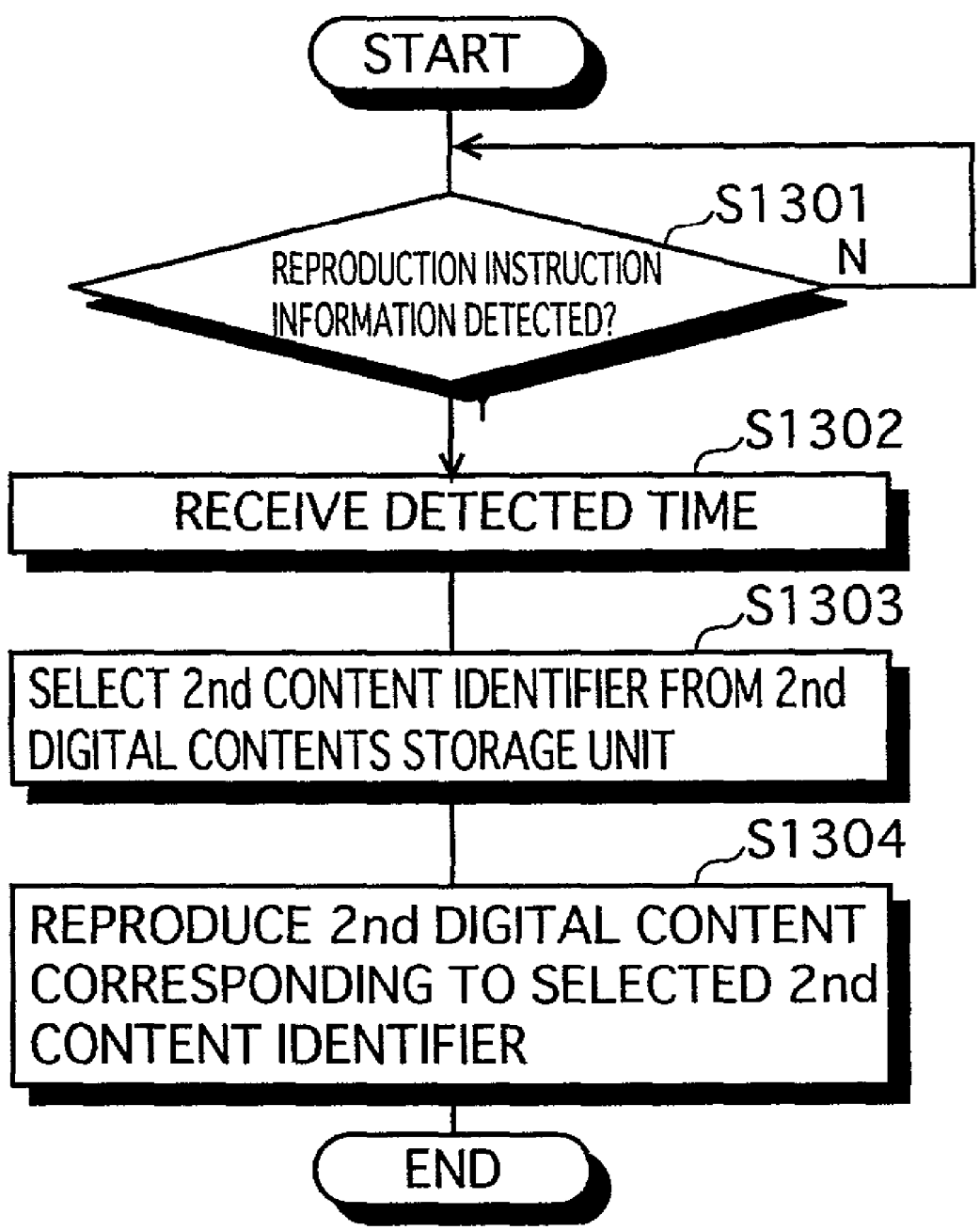
FIG. 11 is a flow chart showing a transaction performed by a control unit 814, in order to select second digital content to be displayed on a monitor unit 815.

The following is a description of the transaction which the control unit 814 performs for selecting second digital content. FIG. 11 is a flow chart showing the transaction performed by the control unit 813 for selecting the second digital content to be displayed on the monitor 815. The following description refers to FIG. 11.

The control unit 813 first detects, in the digital data separated from the transport stream output from the receiving unit 812, the reproduction instruction information instructing to reproduce the second digital content (Step S1301). Then, the control unit 813 receives the time from the time counting unit 811 (Step S1302), and reads out the table from the second digital contents storage unit 811, selects the second content identifier identifying the instructed reproducing time period which includes the time received from the table (Step S1303), reads out, from the second digital contents storage unit 811, the second digital content corresponding to the selected second content identifier, and decodes it into image and audio signals, and finally outputs the results to the monitor unit 815 for displaying (Step S1304).

The following is a more detailed description on the above transaction with reference to FIG. 12. FIG. 12 is an example of the table stored in the second digital contents storage unit 811. Please note that letters with parentheses are added for clarifying the content of second digital content identified by an identifier, and are not included in the actual table.

For example, assume that the control unit 814 receives time information identifying the time 19:14 from the time counting unit 813 in the step S1302. In this example, the control unit 814, in the step S1303, reads out the time information shown by the instructed reproducing time period corresponding to each second content identifier from the FIG. 12 table. The control unit 814, then selects the second content identifiers 3 (specifying a theme park) and 5 (specifying curry), and reads out the second digital content corresponding to both the second content identifiers 3 and 5 from the second digital contents storage unit 811. Lastly, the control unit 814 decodes the second digital content into image and audio data, and outputs these signals to the monitor unit 815 for displaying.

As seen from the above, the digital contents reproducing apparatus 800 of the second embodiment of the present invention first detects the reproduction instruction information instructing the timing in which the advertisement information is to be reproduced. This reproduction instruction information is added to the first digital contents consisting of the broadcast programs distributed from broadcasting station through digital broadcast. And then, this digital contents reproducing apparatus 800 selects the second digital content consisting of the advertisement information depending on the detected time, and outputs the selected second digital content to the reproducing apparatus for reproducing. The above structure 800 prevents users from seeing inadequate advertisement information which does not suit the time period. From a viewpoint of advertisement sponsors, the digital contents reproducing apparatus 800 enables to enhance the advertisement effects by having users see the advertisement information on goods and services at an adequate timing.

The present invention is not restricted to the first and the second embodiments described above.

The present invention is not restricted to the first and the second embodiments described in the above.

For example, in the first embodiment, default contents are stored in the default advertisement information storage unit 722. However, the default contents can be stored in a removable medium such as a DVD which is used to store first digital contents. In such a case, the default contents storage unit 722 becomes unnecessary. Further, second digital contents provided by an advertisement sponsor can also be stored in a removable medium such as a DVD that is used for storing first digital contents, or they can also be stored in the digital contents reproducing apparatus 750.

In the first embodiment, attributes of users which specify target users to provide the second digital content are divided into four groups; age, sex, liking, and annual income. However, in the present invention, the number of groups is not necessarily restricted to four; it can be increased or decreased. For example, user occupation, or residential area can be added to the attributes and the individual information, or annual income originally included can be removed from the attributes and the individual information.

In addition, in the first embodiment, the reproduction control information stores the order of reproducing first digital contents for each version number, and the reproduction of the first digital contents is performed by the reproducing apparatus 750 according to the reproducing order shown by the reproduction control information corresponding to each version number stored in the use condition information. However, reproduction control information can store the reproducing order for the first and the second digital contents corresponding to each version number, and the reproduction of the two contents can be performed by the reproducing apparatus 750 according to the reproducing order which corresponds to the version number of users' choice. For example, the reproduction control information can store several reproducing orders of the first and the second digital contents for each version number as shown in FIG. 13.

In addition, in the first embodiment, the distribution of the removable media such as flexible disks or memory cards which are used for storing information such as second digital contents or the reproduction control information is performed by DVD-rental shops. However, it is also possible to connect the output apparatus 710 and the reproducing apparatus 750 to a network such as the Internet, thereby enabling the users, instead of DVD-rental shops, to send each identifier for the individual information from the user' own reproducing apparatus 750 to the output apparatus directly through the network in order to store each identifier in the individual information storage unit 721, and it can be also made that, when users want to rent the first digital content, users send the user identifier, the first digital content identifier of the user' choice and such use condition information as rental period, number of times the reproduction is possible, and whether copying should be allowed/not. According to each information sent from the users, the output apparatus 710 then can distribute the second digital content output from the output apparatus 710, accompanied by such information as reproduction control information, advertisement usage information, use condition information, and billing information to the reproducing apparatus 750 through the network.

Further, it is also possible to install a first digital contents storage unit 727 inside the information storage unit 720 for storing first digital contents. By doing so, the control unit 730 inside the output apparatus 710 can read, from the first digital contents storage unit 727, the first digital content corresponding to the first digital content identifier which was sent from the user's reproducing apparatus 750 via the network and can send the first digital content to the reproducing apparatus 750 directly through the network.

Also in the first embodiment, the selection of second digital content is performed according to the number of second identifiers that match the first identifiers without prioritizing specified second identifiers, as shown in the flow chart in FIG. 6. However, it is possible to select the second digital content according to the number of the prioritized second identifiers that match the first identifiers. For example (for foreign cars), in the second digital content in FIG. 4, whose second content identifier is 5, it is possible to prioritize the second identifier such as liking and annual income by assigning each of other second identifiers an identifier which does not match any of the corresponding first identifier. That is, in FIG. 5, it is possible to prioritize the above second identifiers by replacing A2 as the second identifier for target age with A4, and replacing S3 as the second identifier for sex with S4. Here A4 and S4 are the identifiers which do not match any of the corresponding first identifiers. By this operation, advertisement sponsors can provide the advertisement information, targeting on the users who have the specified attributes which advertisement sponsors prioritized. Number of matching second identifiers which is used for the judgment in step S1106 in the flow chart of FIG. 7 can be increased or decreased.

Moreover, in the transaction shown in FIG. 8, the transaction process can be modified as described below. After completing step 1108, the reproduction control unit 752 accesses a website which relates to the second digital content reproduced. Then, the reproduction control unit 752 follows the steps of S1204-S1208 depicted in FIG. 9.

In addition, in the second embodiment of the present invention, the second digital contents storage unit 811 stores the table showing correspondence between each second content identifier and the instructed reproducing time period for the second digital content, and correspondence between the provided second digital content and the second content identifier. However, in addition to the instructed reproducing time period, instructed days and instructed dates can also be added to the table. Accompanying this change, the control unit 814 receives information on the current time, day, and date in Step S1302 in FIG. 11 from the time counting unit 813, to select the second content identifier corresponding to the received information from the table, to read the second digital content corresponding to the selected second content identifier from the second digital contents storage unit 811, to decode the second digital content into image and audio signals, and finally to output the signals to the reproducing apparatus 820 for reproducing.

From the above construction, advertisement sponsors can enhance the effectiveness of an advertisement by having target users watch the advertisement information at a timing which is effective to catch users' attention. For example, providing users with advertisement information on a theme park, or its events before the holidays is an effective way to advertise a theme park.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A digital contents reproducing apparatus comprising:
    an information storage unit operable to store a plurality of second digital contents;
    a receiving unit operable to receive a transport stream sent from a broadcasting station, the transport stream containing first digital content and reproduction control information that is used for selection of one of the second digital contents being matchable to a time at which the reproduction control information is detected by the digital contents reproducing apparatus;
    a table retaining unit operable to retain a reproducing time table indicating, for each of the second digital contents, a reproducing time period of the second digital content;
    a time detecting unit operable to detect the reproduction control information from the received transport stream, and obtain the detection time of the reproduction control information; and
    a reproducing unit operable to select and reproduce one of the second digital contents whose reproducing time period indicated by the reproducing time table includes the detection time of the reproduction control information.

2. A digital contents reproducing method performed by a digital contents reproducing apparatus including an information storage unit operable to store a plurality of second digital contents and a table retaining unit operable to retain a reproducing time table indicating, for each of the second digital contents, a reproducing time period of the second digital content, the digital contents reproducing method comprising:
    receiving a transport stream sent from a broadcasting station, the transport stream containing first digital content and reproduction control information that is used for selection of one of the second digital contents beiun matchable to a time at which the reproduction control information is detected by the digital contents reproducing apparatus;
    detecting the reproduction control information from the received transport stream, and obtaining the detection time of the reproduction control information; and
    selecting and reproducing one of the second digital contents whose reproducing time period indicated by the reproducing time table includes the detection time of the reproduction control information.

* * * * *

UNITED STATES PATENT AND TRADEMARK OFFICE
CERTIFICATE OF CORRECTION

| | | |
|---|---|---|
| PATENT NO. | : 7,333,949 B2 | Page 1 of 1 |
| APPLICATION NO. | : 09/983264 | |
| DATED | : February 19, 2008 | |
| INVENTOR(S) | : Yusuke Shimizu et al. | |

It is certified that error appears in the above-identified patent and that said Letters Patent is hereby corrected as shown below:

Column 18
Line 16, "beiun" should read --being--

Signed and Sealed this

First Day of July, 2008

JON W. DUDAS
*Director of the United States Patent and Trademark Office*